(12) United States Patent
Elangovan et al.

(10) Patent No.: US 8,763,364 B2
(45) Date of Patent: Jul. 1, 2014

(54) TREATMENT OF COLD START ENGINE EXHAUST

(75) Inventors: Shanmugam Palani Elangovan, Kameido (JP); Tatsuya Okubo, Machida (JP); Stacey I. Zones, San Francisco, CA (US); Cong-Yan Chen, Kensington, CA (US); Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 331 days.

(21) Appl. No.: 13/088,885

(22) Filed: Apr. 18, 2011

(65) Prior Publication Data

US 2012/0260628 A1 Oct. 18, 2012

(51) Int. Cl.
*F01N 3/00* (2006.01)
*B01D 53/02* (2006.01)
*B01D 53/94* (2006.01)
*F01N 3/10* (2006.01)
*F01N 9/00* (2006.01)

(52) U.S. Cl.
CPC .......... *F01N 3/101* (2013.01); *B01D 53/02* (2013.01); *B01D 53/9486* (2013.01); *B01D 2253/108* (2013.01); *Y02T 10/47* (2013.01); *Y02T 10/22* (2013.01); *F01N 2370/02* (2013.01); *B01D 2253/1122* (2013.01); *F01N 9/00* (2013.01); *F01N 3/106* (2013.01)
USPC ........... 60/274; 60/299; 422/171; 422/177; 423/212; 423/213.2; 423/700

(58) Field of Classification Search
USPC ............. 60/274, 299; 423/213.2, 213.5, 212, 423/700; 422/171, 177
See application file for complete search history.

(56) References Cited

U.S. PATENT DOCUMENTS

| | | | |
|---|---|---|---|
| 3,140,249 A | 7/1964 | Plank et al. |
| 3,140,251 A | 7/1964 | Plank et al. |
| 3,140,253 A | 7/1964 | Plank et al. |
| 3,767,453 A | 10/1973 | Hoekstra |
| 3,785,998 A | 1/1974 | Hoekstra |
| 3,920,583 A | 11/1975 | Pugh |
| 4,528,279 A | 7/1985 | Suzuki et al. |
| 4,760,044 A | 7/1988 | Joy, III et al. |
| 4,791,091 A | 12/1988 | Bricker et al. |
| 4,868,148 A | 9/1989 | Henk et al. |

(Continued)

OTHER PUBLICATIONS

M.D. Shannon, J.L. Casci, P.A.Cox, and S.J. Andrews "Structure of the Two-Dimensional Medium-Pore High-Silica Zeolite NU-87" Nature, 1991, 353, 417-420.

(Continued)

*Primary Examiner* — Thomas Denion
*Assistant Examiner* — Kelsey Stanek
(74) *Attorney, Agent, or Firm* — Terrence Flaherty; E. Joseph Gess

(57) ABSTRACT

A method of treating a cold-start engine exhaust gas stream comprising hydrocarbons and other pollutants, the method comprising: flowing the exhaust gas stream over a molecular sieve bed, the molecular sieve bed comprising an alkali metal cation-exchanged molecular sieve having intersecting 10- and 12-membered ring pore channels, to provide a first exhaust stream; flowing the first exhaust gas stream over a catalyst to convert any residual hydrocarbons and other pollutants contained in the first exhaust gas stream to innocuous products to provide a treated exhaust stream; and discharging the treated exhaust stream into the atmosphere.

17 Claims, 9 Drawing Sheets

(56) References Cited

U.S. PATENT DOCUMENTS

| | | | |
|---|---|---|---|
| 4,868,149 | A | 9/1989 | Bricker |
| 4,910,006 | A * | 3/1990 | Zones et al. ............... 423/706 |
| 4,963,337 | A * | 10/1990 | Zones ........................ 423/277 |
| 5,102,641 | A | 4/1992 | Casci et al. |
| 5,512,267 | A | 4/1996 | Davis et al. |
| 6,049,018 | A | 4/2000 | Calabro et al. |
| 6,235,255 | B1 | 5/2001 | Kharas |
| 6,544,495 | B1 | 4/2003 | Elomari |
| 6,790,433 | B2 | 9/2004 | Chen et al. |
| 7,022,308 | B1 | 4/2006 | Yuen et al. |
| 7,226,576 | B2 | 6/2007 | Elomari |
| 7,344,696 | B2 | 3/2008 | Canos et al. |
| 7,449,169 | B2 | 11/2008 | Corma Canos et al. |
| 7,837,978 | B2 | 11/2010 | Burton |
| 7,858,059 | B2 * | 12/2010 | Davis et al. ............ 423/213.2 |
| 2008/0159936 | A1 * | 7/2008 | Zones et al. ............ 423/213.5 |
| 2009/0301934 | A1 * | 12/2009 | Miller et al. .................. 208/65 |
| 2012/0024754 | A1 * | 2/2012 | Chen et al. .................... 208/65 |
| 2012/0110988 | A1 * | 5/2012 | Dotzel et al. ................. 60/299 |

OTHER PUBLICATIONS

R.F. Lobo, M. Pan, I. Chan, H-X Li, R.C. Medrud, S.I. Zones, P.A. Crozier, and M.E. Davis "SSZ-26 and SSZ-33: Two Molecular Sieves with Intersecting 10- and 12-Ring Pores" Science, 1993, 262, 1543-1546.

A. Corma, F. Rey, S. Valencia, J.L. Jorda and J. Rius "A Zeolite with Interconnected 8-, 10- and 12-Ring Pores and its Unique Catalytic Selectivity" Nature Mater., 2003, 2, 493-497.

R. Castaneda, A. Corma, V. Fornes, F. Rey and J. Rius "Synthesis of a New Zeolite Structure ITQ-24, with Intersecting 10- and 12-Membered Ring Pores" J. Am. Chem. Soc., 2003, 125, 7820-7821.

S.P. Elangovan, M. Ogura, M.E. Davis, and T. Okubo "SSZ-33: A Promising Material for Use as a Hydrocarbon Trap" J. Phys. Chem. B, 2004, 108, 13059-13061.

S.P. Elangovan, M. Ogura, S. Ernst, M. Hartmann, S. Tontisirin, M.E. Davis, and T. Okubo "A Comparative Study of Zeolites SSZ-33 and MCM-68 for Hydrocarbon Trap Applications" Microporous Mesoporous Mater., 2006, 96, 210-215.

S. Elomari, A. Burton, R.C. Medrud, and R. Grosse-Kunstleve "The Synthesis, Characterization, and Structure Solution of SSZ-56: An Extreme Example of Isomer Specificty in the Structure Direction of Zeolites" Microporous Mesoporous Mater., 2009, 118, 325-333.

* cited by examiner

TREATMENT OF COLD START ENGINE EXHAUST

TECHNICAL FIELD

The invention relates generally to a method for the treatment of cold start engine exhaust using an alkali metal cation-exchanged molecular sieve having intersecting 10- and 12-membered ring pore channels.

BACKGROUND

Future low emissions standards for vehicles are forcing automobile and catalyst manufacturers to focus on reducing cold start hydrocarbon emissions since a large portion of hydrocarbon emissions occur during the cold start period. Consequently, control of emissions during the cold start operation of a vehicle containing an internal combustion engine is essential. Vehicles equipped with a conventional three-way catalytic converter typically contain precious metals supported on a washcoat layer, which in turn is deposited on a monolithic carrier. Fresh catalysts start to operate at about 170° C., while aged catalysts work only at about 200° C. to 225° C. These catalysts usually require at least 1 to 2 minutes to reach such temperatures, and during this "cold start" period, 70 to 80% of the tailpipe hydrocarbon emissions occur.

The critical factors for any emission hydrocarbon trap are the adsorption capacity of the adsorbent, the desorption temperature at which adsorbed hydrocarbons are desorbed and passed to the catalytic converter (must be higher than the catalyst operating temperature), and the hydrothermal stability of the adsorbent. Molecular sieves such as zeolites have generally been found to be useful adsorbents for this application in part due to their hydrothermal stability under these conditions compared to other materials.

Various studies have focused on the use of molecular sieves, and zeolites in particular, as adsorbents, including medium and large pore zeolites, although, in some cases, the types of molecular sieves or zeolites used have not been identified. A series of zeolites (e.g., beta, ZSM-5, mordenite, and Y) have been investigated in such studies for their hydrocarbon adsorption capacity under a variety of conditions.

Previous investigations have thus far found zeolite-beta to be a promising material for this application. However, aged zeolite-beta catalysts demonstrate degraded performance in trapping hydrocarbons due to low hydrothermal stability when used as an exhaust gas adsorbent. Hence, despite advances in the art, an important need continues to exist for a material that possesses a better adsorption capacity, higher desorption temperature, and hydrothermal stability than current adsorbents such as zeolite-beta for use in emission control, particularly during the cold start operation of an internal combustion engine.

SUMMARY OF THE INVENTION

Figure 1:
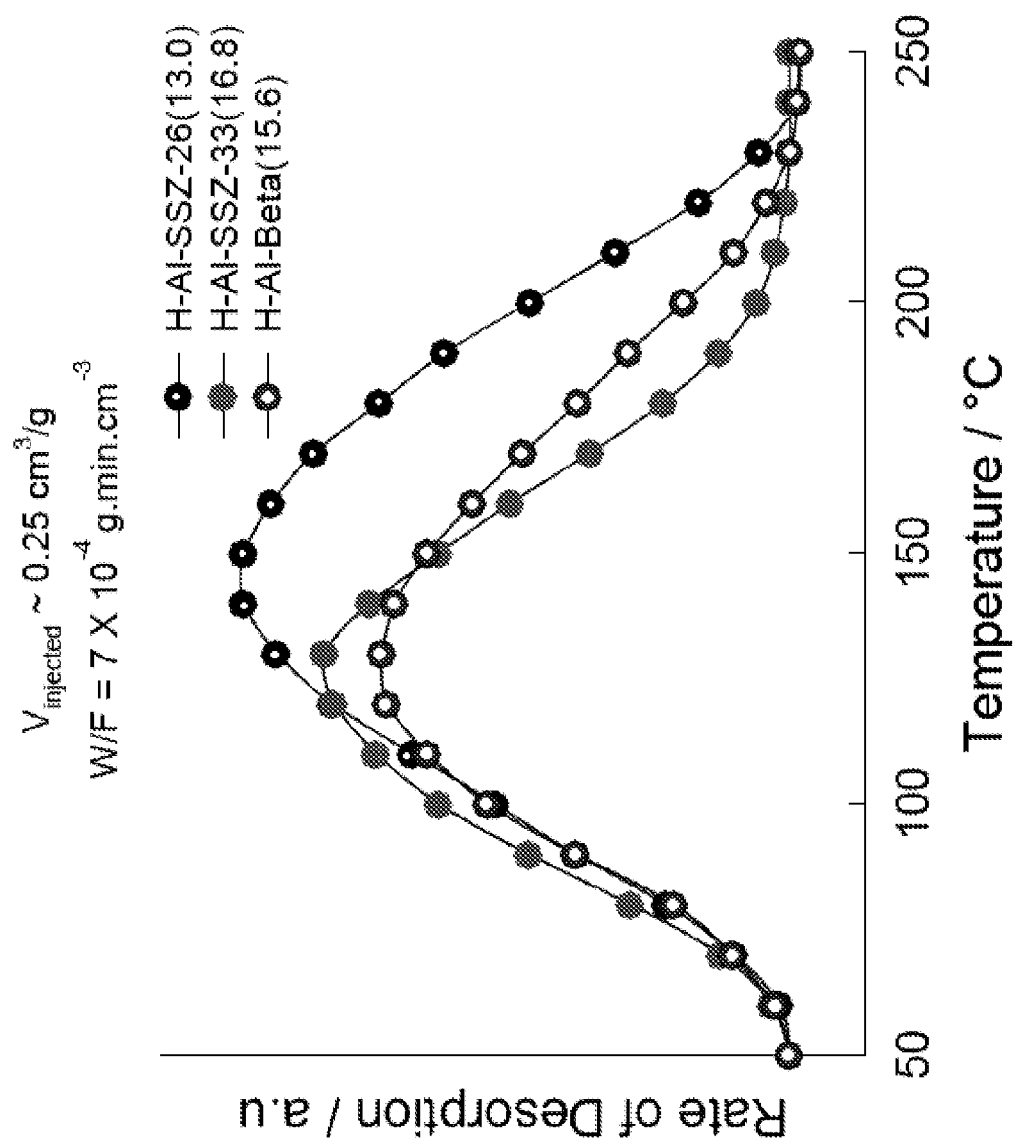
FIG. 1 illustrates the toluene desorption profiles for H-Al-SSZ-26, H-Al-SSZ-33 and H-Al-zeolite-beta.

In one aspect, the invention relates to a method of treating a cold-start engine exhaust gas stream comprising hydrocarbons and other pollutants, the method comprising: flowing the exhaust gas stream over a molecular sieve bed, the molecular sieve bed comprising an alkali metal cation-exchanged molecular sieve having intersecting 10- and 12-membered ring pore channels, to provide a first exhaust stream; flowing the first exhaust gas stream over a catalyst to convert any residual hydrocarbons and other pollutants contained in the first exhaust gas stream to innocuous products to provide a treated exhaust stream; and discharging the treated exhaust stream into the atmosphere.

In yet another aspect, the invention relates to a method for removing toluene from a gaseous hydrocarbon stream comprising: passing a toluene-containing hydrocarbon stream over an adsorbent comprising an alkali metal cation-exchanged molecular sieve having intersecting 10- and 12-membered ring pore channels; and recovering a product stream with reduced toluene content.

DETAILED DESCRIPTION

The following terms will be used throughout the specification and will have the following meanings unless otherwise indicated.

The term "pollutants" refers to any unburned fuel components and combustion by-products found in an engine exhaust gas stream. For example, when the fuel is a hydrocarbon fuel, hydrocarbons, nitrogen oxides, carbon monoxide and other combustion by-products will be found in the engine exhaust gas stream.

The term "CON type molecular sieve" refers to molecular sieves known in the art as having the framework structure designated as "CON" by the Nomenclature Committee of the International Zeolite Association.

When an engine is started up, exhaust gases are produced from the combustion of a hydrocarbon fuel. The engine may be a jet engine, a gas turbine, an internal combustion engine (e.g., an automobile, truck, or bus engine), or the like. Exhaust gases produced from the combustion of a hydrocarbon fuel contain a plurality of combustion components, typically including linear and branched chain non-aromatic hydrocarbons, cycloaliphatic hydrocarbons, aromatic hydrocarbons, polycyclic hydrocarbons and mixtures thereof, as well as non-hydrocarbon components such as carbon dioxide, water, nitrogen oxides and sulfur dioxide. Included within such emissions compounds are aromatic hydrocarbons such as toluene, xylene, benzene and mixtures thereof; linear and branched hydrocarbons such as methane, ethane, ethylene, propane, propylene, butane, pentane, hexane, heptane, octane; cycloaliphatic hydrocarbons such as cyclohexane;

and additional fuel additives such as alcohols and methyl tertiary butyl ether. The method of the invention may be advantageously utilized to reduce such hydrocarbon emissions, particularly during cold start operation of an internal combustion engine, without being necessarily limited to a particular hydrocarbon fuel. Typical hydrocarbon fuels benefiting from the present invention include gasoline, diesel fuel, aviation fuel, and the like.

The temperature of this engine exhaust stream is relatively cool, generally below 500° C. and typically in the range of 200° C. to 400° C. This engine exhaust gas stream has the above characteristics during the initial period of engine operation, typically for the first 30 to 120 seconds after startup of a cold engine. The engine exhaust stream will typically contain, by volume, about 500 to 1000 ppm hydrocarbons.

The engine exhaust gas stream which is to be treated is flowed over a molecular sieve bed comprising an alkali metal cation-exchanged molecular sieve having intersecting 10- and 12-membered ring pore channels to provide a first exhaust stream. The molecular sieve is described below. The first exhaust stream which is discharged from the molecular sieve bed is then flowed over a catalyst to convert the pollutants contained in the first exhaust stream to innocuous components and provide a treated exhaust stream which is discharged into the atmosphere. It is understood that prior to discharge into the atmosphere, the treated exhaust stream may be flowed through a muffler or other sound reduction apparatus well known in the art.

The catalyst which is used to convert the pollutants to innocuous components is usually referred to in the art as a three-component control catalyst because it can simultaneously oxidize any residual hydrocarbons present in the first exhaust stream to carbon dioxide and water, oxidize any residual carbon monoxide to carbon dioxide and reduce any residual nitric oxide to nitrogen and oxygen. In some cases, the catalyst may not be required to convert nitric oxide to nitrogen and oxygen, e.g., when an alcohol is used as the fuel. In this case, the catalyst is called an oxidation catalyst. Because of the relatively low temperature of the engine exhaust stream and the first exhaust stream, this catalyst does not function at a very high efficiency thereby necessitating the molecular sieve bed.

When the molecular sieve bed reaches a sufficient temperature, typically about 150° C. to 250° C., the pollutants which are adsorbed in the bed begin to desorb and are carried by the first exhaust stream over the catalyst. This regenerates the adsorbent bed so that it can adsorb hydrocarbons during a subsequent cold start. At this point, the catalyst has reached its operating temperature and is therefore capable of fully converting the pollutants to innocuous components.

The adsorbent bed used in the present invention can be conveniently employed in particulate form or the adsorbent can be deposited onto a solid monolithic carrier. When the particulate form is desired, the adsorbent can be used in the form of powders, pills, pellets, granules, rings, spheres, etc. In the employment of a monolithic form, it is usually most convenient to employ the adsorbent as a thin film or coating deposited on an inert carrier material which provides the structural support for the adsorbent. The inert carrier material can be any refractory material such as ceramic or metallic materials. It is desirable that the carrier material be unreactive with the adsorbent and not be degraded by the gas to which it is exposed. Examples of suitable ceramic materials include sillimanite, petalite, cordierite, mullite, zircon, zircon mullite, spondumene, alumina-titanate, etc. Examples of metallic materials which serve as inert carrier material include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. Conveniently, the configuration may be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, see U.S. Pat. Nos. 3,785,998 and 3,767,453.

The molecular sieve can be deposited onto the carrier by any convenient way well known in the art. One convenient method involves preparing a slurry using the molecular sieve coating the monolithic honeycomb carrier with the slurry. The slurry can be prepared by means known in the art such as combining the appropriate amount of the molecular sieve and a binder with water. This resulting mixture can then blended by using means such as sonication, milling, etc. This slurry can be used to coat a monolithic honeycomb by dipping the honeycomb into the slurry, removing the excess slurry by draining or blowing out the channels, and heating to about 100° C. If the desired loading of molecular sieve combination is not achieved, the above process may be repeated as many times as required to achieve the desired loading.

Instead of depositing the molecular sieve onto a monolithic honeycomb structure, one can take the molecular sieve and form it into a monolithic honeycomb structure by means known in the art.

The adsorbent may optionally contain one or more catalytic metals dispersed thereon. The metals which can be dispersed on the adsorbent are the noble metals which consist of platinum, palladium, rhodium, ruthenium, and mixtures thereof. The desired noble metal may be deposited onto the adsorbent, which acts as a support, in any suitable manner well known in the art. One example of a method of dispersing the noble metal onto the adsorbent support involves impregnating the adsorbent support with an aqueous solution of a decomposable compound of the desired noble metal or metals, drying the adsorbent which has the noble metal compound dispersed on it and then calcining in air at a temperature of 400° C. to 500° C. for a time of about 1 to about 4 hours. By decomposable compound is meant a compound which upon heating in air gives the metal or metal oxide. Examples of the decomposable compounds which can be used are set forth in U.S. Pat. No. 4,791,091. Typical decomposable compounds are chloroplatinic acid, rhodium trichloride, chloropalladic acid, hexachloroiridic (IV) acid and hexachlororuthenate. The noble metal is typically present in an amount ranging from 0.01 to 4 wt. % of the adsorbent support. Specifically, in the case of platinum and palladium, the range is 0.1 to 4 wt. %, while in the case of rhodium and ruthenium, the range is from about 0.01 to 2 wt. %.

These catalytic metals are capable of oxidizing the hydrocarbon and carbon monoxide and reducing the nitric oxide components to innocuous products. Accordingly, the adsorbent bed can act both as an adsorbent and as a catalyst.

The catalyst in the catalytic converter may be selected from any three component control or oxidation catalyst well known in the art. Examples of catalysts are those described in U.S. Pat. Nos. 4,528,279; 4,791,091; 4,760,044; 4,868,148; and 4,868,149. Typical catalysts well known in the art are those that contain platinum and rhodium and optionally palladium, while oxidation catalysts usually do not contain rhodium.

Oxidation catalysts usually contain platinum and/or palladium metal. These catalysts may also contain promoters and stabilizers such as barium, cerium, lanthanum, nickel, and iron. The noble metals promoters and stabilizers are usually deposited on a support such as alumina, silica, titania, zirconia, alumino silicates, and mixtures thereof with alumina being preferred. The catalyst can be conveniently employed in particulate form or the catalytic composite can be deposited on a solid monolithic carrier with a monolithic carrier being preferred. The particulate form and monolithic form of the catalyst are prepared as described for the adsorbent above.

In general, any alkali metal cation-exchanged molecular sieve having intersecting 10- and 12-membered ring pore channels is intended to be suitable for use in the invention.

Crystalline molecular sieves all have a three-dimensional, four-connected framework structure of corner-sharing [$TO_4$] tetrahedra, where T is one or more tetrahedrally coordinated cations. Examples of well known molecular sieves include silicates, which comprise [$SiO_4$] tetrahedral units, and aluminosilicates, which comprise [$SiO_4$] and [$AlO_4$] tetrahedral units. Molecular sieves are typically described in terms of the size of the ring that defines a pore, where the size is based on the number of T atoms in the ring. In one embodiment, the molecular sieve is an aluminosilicate.

Molecular sieves having intersecting 10- and 12-membered ring pore channels connect to form a large void volume at the intersections. While not intending to be bound thereby, it is believed that the porosity of these molecular sieves provides beneficial adsorption properties, in part, since transport of diffusing molecules can occur in the 12-membered ring pore system, the 10-membered ring pores, or in both types of pores.

While not intended to be limited thereto, suitable examples of molecular sieves having intersecting 10- and 12-membered ring pore channels include molecular sieves such as ITQ-22, MCM-68, NU-87, SSZ-56, SSZ-57, CON type molecular sieves, and mixtures thereof. Suitable examples of CON type molecular sieves include CIT-1, ITQ-24, SSZ-26, SSZ-33, and mixtures thereof. In one embodiment, the molecular sieve is selected from SSZ-26, SSZ-33, and mixtures thereof.

The structural characteristics, x-ray diffraction pattern data, and methods for preparing these molecular sieves are described in numerous publications and patents. Molecular sieve ITQ-22 is disclosed in U.S. Pat. No. 7,449,169. Molecular sieve MCM-68 is disclosed in U.S. Pat. No. 6,049,018. Molecular sieve NU-87 is disclosed in U.S. Pat. No. 5,102,641. Molecular sieve SSZ-56 is disclosed in U.S. Pat. No. 7,226,576. Molecular sieve SSZ-57 is disclosed in U.S. Pat. No. 6,544,495. Molecular sieve CIT-1 is disclosed in U.S. Pat. No. 5,512,267. Molecular sieve ITQ-24 is disclosed in U.S. Pat. No. 7,344,696. Molecular sieve SSZ-26 is disclosed in U.S. Pat. Nos. 4,910,006 and 7,837,978. Molecular sieve SSZ-33 is disclosed in U.S. Pat. Nos. 4,963,337; 6,790,433; and 7,022,308.

SSZ-26 and SSZ-33 can be characterized as members of a family of materials in which the two end members are formed by the stacking of layers in an ABAB sequence or an ABCABC sequence. The framework formed by the ABAB stacking sequence ("polymorph A") is of orthorhombic symmetry and the framework formed by the ABCABC stacking sequence ("polymorph B") is of monoclinic symmetry. In between these end-member polymorphs there is a whole family of materials that can be characterized by a fault probability "p" of 0%<p<100% (referred to herein as "SSZ-26/33 family"). If the fault probability is p=0%, the end member polymorph B is obtained, and if p=100%, the end member polymorph A is obtained. The aluminosilicate SSZ-26 and the borosilicate SSZ-33 are members of this disorder family of materials and CIT-1 corresponds to a pure or nearly pure polymorph B (see Ch. Baerlocher et al., *Atlas of Zeolite Framework Types*, 2007, 102-103; and M. M. J. Treacy et al., *Collection of Simulated XRD Powder Patterns for Zeolites*, 2007, 120-121 and 481).

SSZ-26 and SSZ-33 are members of the same series of intergrowth structures; they differ in the degree of intergrowth of the two polytype end members that comprise the intergrowth series. Therefore, all things being equal (e.g., heteroatom content and identity, crystallite size and morphology), the two materials should exhibit similar adsorption behavior.

SSZ-26 and SSZ-33 are used in many commercial applications, including hydrocarbon trapping applications (e.g., see U.S. Patent Application Publication No. 2008/0159936). These two zeolites have been found to be among the best zeolites for hydrocarbon trapping applications in automobiles due to their robust hydrothermal stability and their relatively high hydrocarbon adsorption capacities.

In the present invention, alkali metal cation-exchanged molecular sieves having intersecting 10- and 12-membered ring pore channels have demonstrated enhanced desorption temperatures and improved hydrothermal stability. The term "cation-exchanged" is taken to mean a technique whereby metal ions, specifically alkali metal cations in this case, actually replace a portion or essentially all of the $H^+$ or $NH_4^+$ ions of the molecular sieve. This term does not refer to the elemental replacement of one framework element by another potential framework element. Framework elements are generally those elements that are tetrahedrally bonded through oxygen to each other for providing the typical molecular sieve framework.

Typical ion exchange techniques involve contacting the molecular sieve with a solution containing a salt of the desired replacing cation or cations. Although a wide variety of salts can be employed, chlorides and other halides, nitrates, and sulfates are typically used. Representative ion exchange techniques are disclosed in a wide variety of patents including U.S. Pat. Nos. 3,140,249; 3,140,251; and 3,140,253. Ion exchange can take place either before or after the molecular sieve is calcined. Following contact with the salt solution of the desired replacing cation, the molecular sieve is typically washed with water and dried at temperatures ranging from 65° C. to 315° C. After washing, the molecular sieve can be calcined in air or inert gas at temperatures ranging from 200° C. to 820° C. for periods of time ranging from 1 to 48 hours, or more, to produce an active product especially useful in the treatment of cold start engine exhaust. Regardless of the cations present in the synthesized form of the molecular sieve, the spatial arrangement of the atoms which form the basic crystal lattice of the molecular sieve remains essentially unchanged. The exchange of cations has little, if any, effect on the molecular sieve lattice structure.

The molecular sieve generally has at least 80% and typically at least 95% or substantially all (at least 99%) of its ion-exchangeable sites exchanged with an alkali metal cation. In one embodiment, the alkali metal cation is selected from sodium, potassium, cesium, and mixtures thereof. In another embodiment, the alkali metal cation is selected from sodium, potassium, and mixtures thereof. In yet another embodiment, the alkali metal cation is sodium.

EXAMPLES

The following examples are given to illustrate the present invention. It should be understood, however, that the invention is not to be limited to the specific conditions or details described in these examples.

SSZ-26 was prepared according to the procedure reported in U.S. Pat. No. 4,910,006. Borosilicate SSZ-33 (herein referred to as "B-SSZ-33") was prepared according to U.S. Pat. No. 4,963,337. Samples were calcined at 540° C. to remove the occluded structure directing agent. Aluminosilicate SSZ-33 (herein referred to as "Al-SSZ-33") was prepared according to U.S. Pat. No. 6,790,433. Zeolite-beta was obtained from Tosoh Corporation (Tokyo, Japan).

All samples were first converted to the $H^+$ form by three-fold ion exchange at 80° C. with 0.1M $NH_4Cl$ followed by calcination at 500° C. for about 3 hours.

SEM images were recorded on a Hitachi S-5200 (working voltage 1 kV).

Powder XRD patterns were obtained on an M03X-HF (Bruker AXS) diffractometer using Cu Kα radiation (40 kV, 40 mA) and in the range of 5 to 50 degree, 2θ.

The temperature-programmed desorption (TPD) of toluene was used to investigate the desorption characteristics of zeolites and was carried out by gas chromatography (Shimadzu model GC-9A) with a thermal conductivity detector (TCD) and/or flame ionization detector (FID). A sample of approximately 20 mg was placed in a quartz tube of 4 mm i.d. between quartz wool and glass beads. Subsequently, the sample was activated in a flow of helium (30 mL/min) at 390° C. for about 1 h. After cooling the column to a temperature of 50° C., toluene was injected 5 times (each of 0.05 $cm^3/g$) using a pulse method. Desorption was performed by heating the column from 50° C. to 390° C. at a heating rate of 10K/min (β) and maintained at the same temperature for about 10 min (W/F of about $1 \times 10^{-4}$ g.min.$cm^{-3}$ wherein W/F is weight of the molecular sieve/flow rate of carrier gas).

Example 1

Toluene Desorption Profiles for H-Al-SSZ-26, H-Al-SSZ-33 and H-Zeolite-Beta

The toluene desorption for H-SSZ-26 ($SiO_2/Al_2O_3$ ratio=13.0), H-SSZ-33 ($SiO_2/Al_2O_3$ ratio=16.8) and H-zeolite-beta ($SiO_2/Al_2O_3$ ratio=15.6) was carried out according to the TPD procedures described above. The toluene desorption profiles for these zeolites are depicted in FIG. 1.

Example 2

Hydrothermal Treatment of H-Al-SSZ-33 and H-B-SSZ-33

Hydrothermal treatments are generally intended to simulate the conditions experienced in an exhaust gas emission system. Hydrothermal treatment was carried out in the presence of 10 wt. % water vapor at 800° C. for about 5 hours in a stream of with a flow of about 25 mL/min. Hydrothermally treated molecular sieves are also described herein as "aged."

Figure 2:
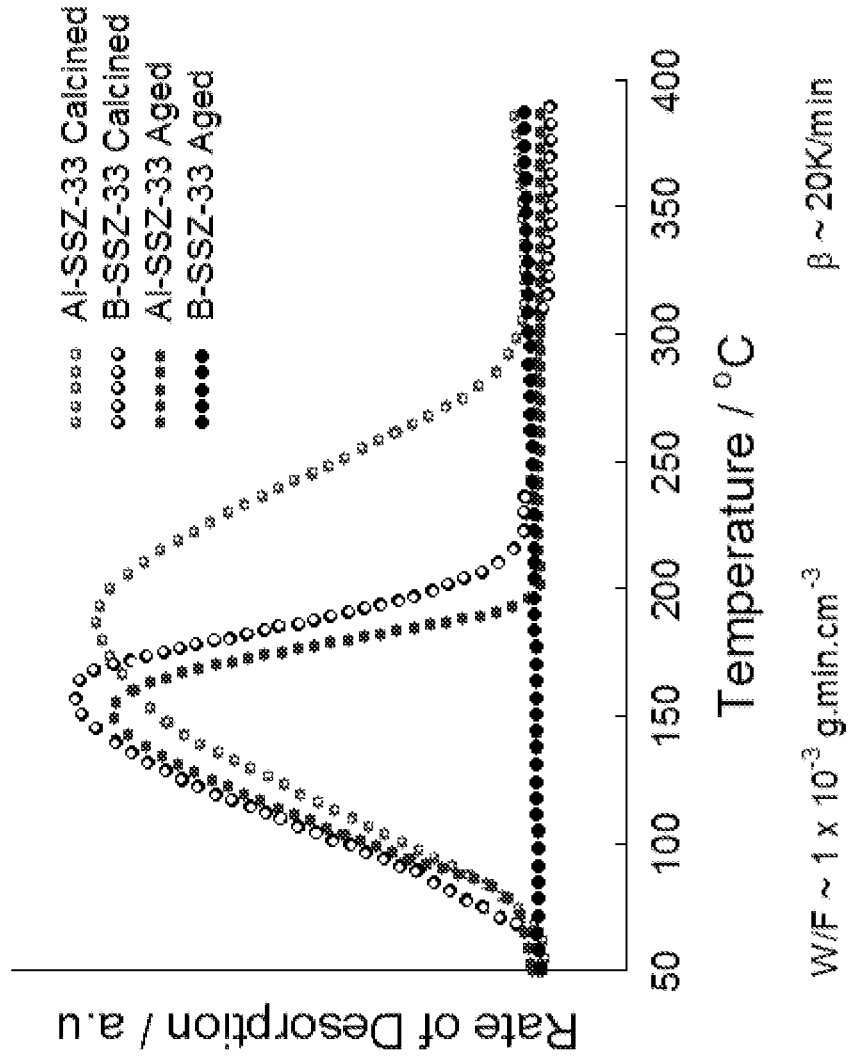
FIG. 2 illustrates toluene desorption profiles for Al-SSZ-33 and B-SSZ-33 before and after hydrothermal treatment.
Figure 3:
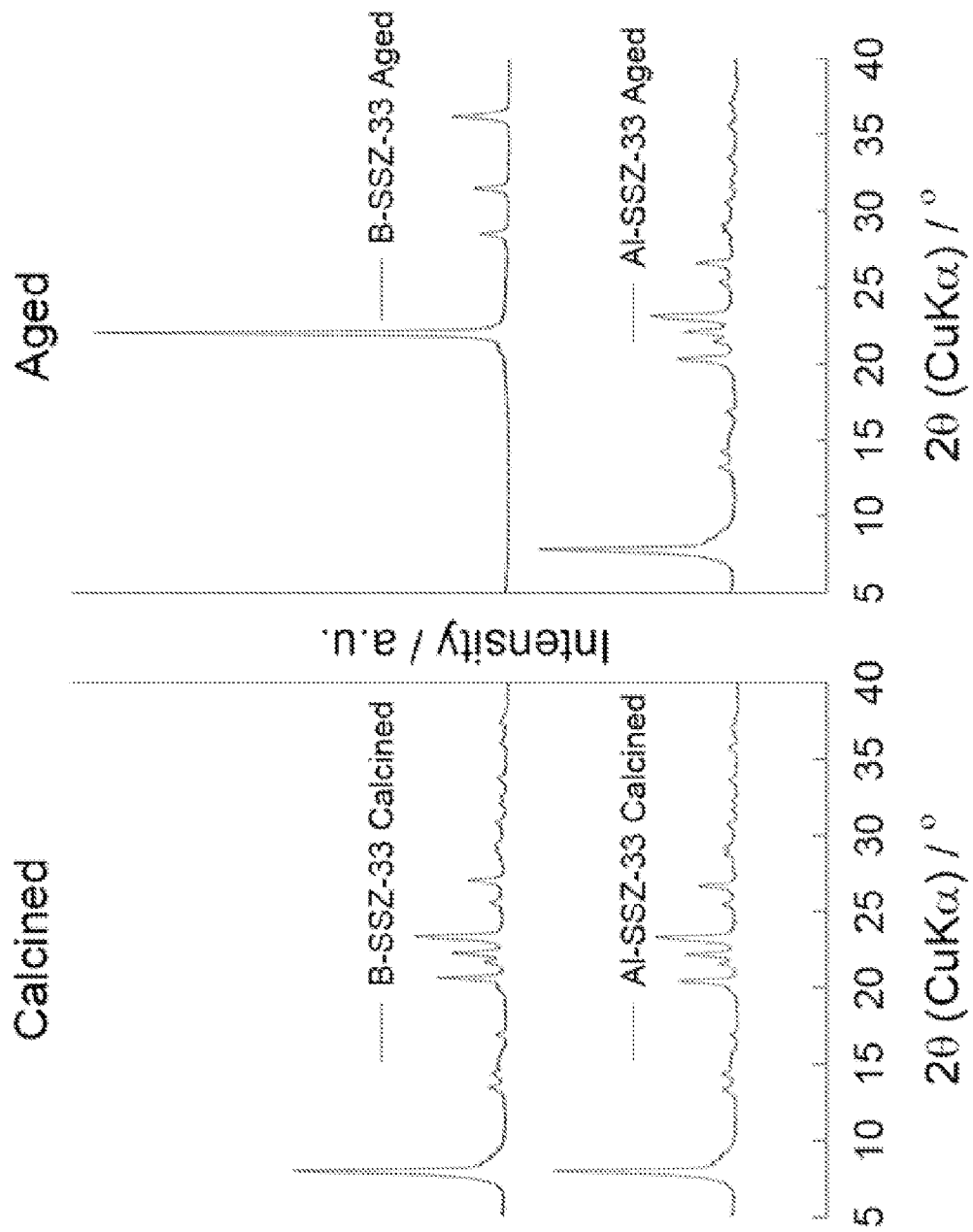
FIG. 3 depicts the powder X-ray diffraction (XRD) patterns for Al-SSZ-33 and B-SSZ-33 before and after hydrothermal treatment.
Figure 4:
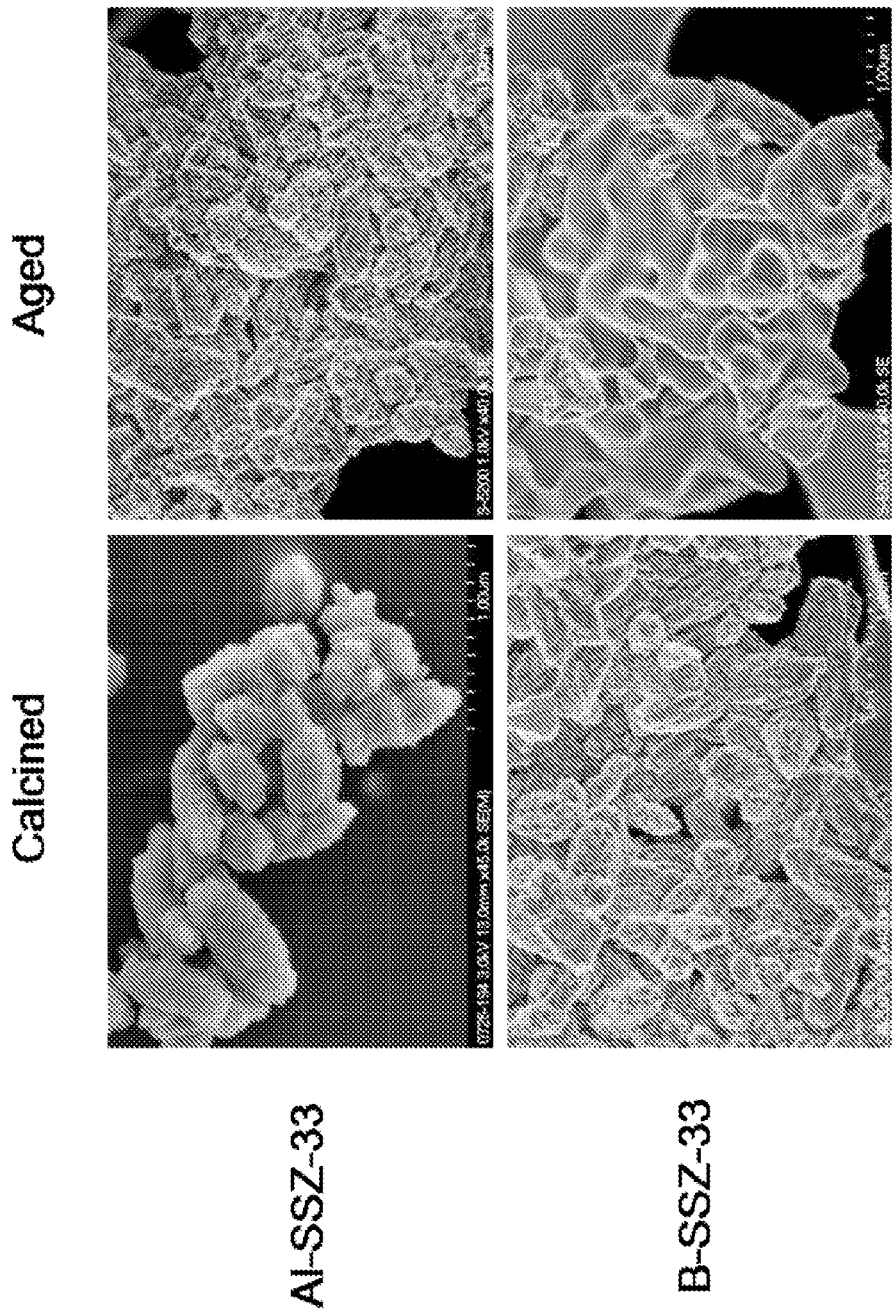
FIG. 4 depicts the scanning electron microscopy (SEM) images for Al-SSZ-33 and B-SSZ-33 before and after hydrothermal treatment.

As shown in FIG. 2, the rate of desorption of toluene of aged Al-SSZ-33 is relatively similar to that of B-SSZ-33 with respect to adsorption capacity and desorption temperature. While not wishing to be bound by any particular theory, it is believed that the increased adsorption capacity of may be ascribed to the possible presence of defects sites in Al-SSZ-33 which are obtained during the post-modification treatment process. Aged B-SSZ-33 completely loses its adsorption capacity. FIG. 3 depicts the powder XRD patterns for Al-SSZ-33 and B-SSZ-33 before and after hydrothermal treatment. The XRD pattern of hydrothermally treated B-SSZ-33 indicates that it undergoes structural collapse under these conditions and is transformed mostly to a dense phase. FIG. 4 depicts the SEM images for Al-SSZ-33 and B-SSZ-33 before and after hydrothermal treatment.

Example 3

Figure 5:
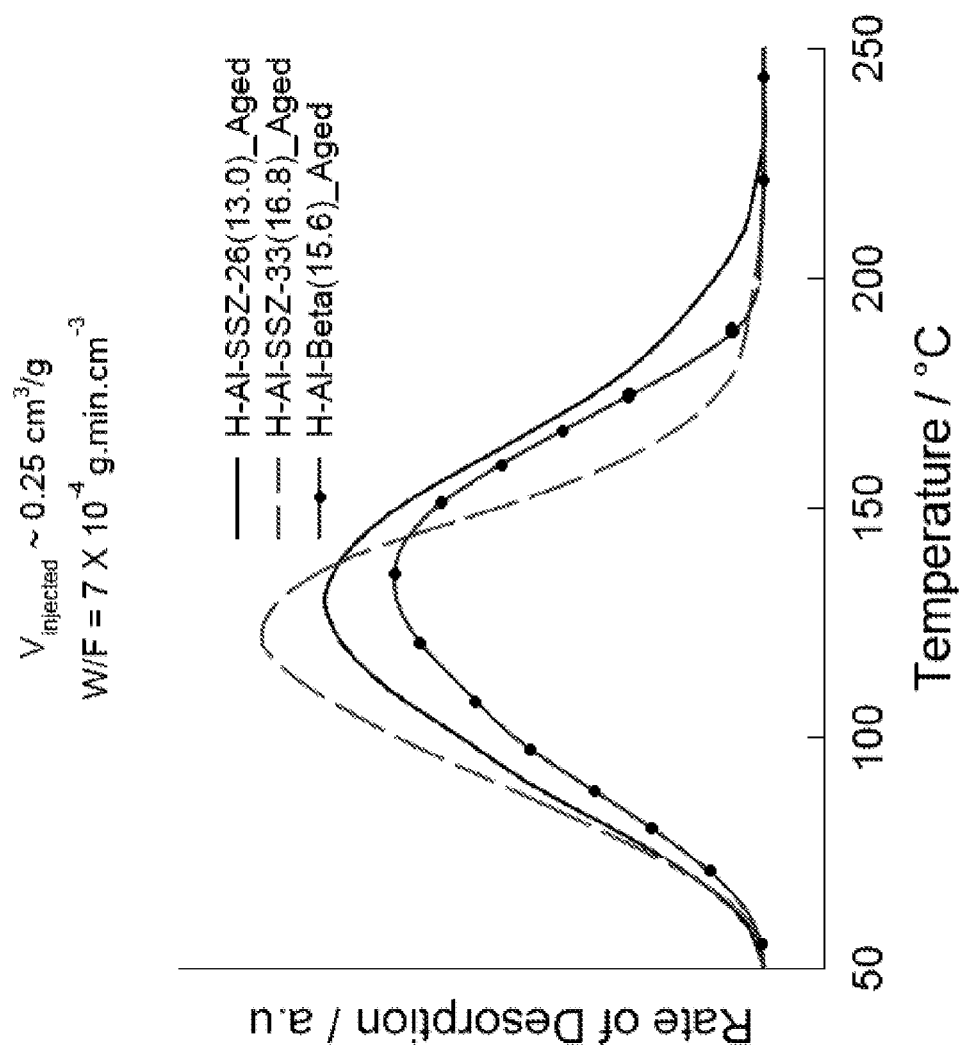
FIG. 5 illustrates toluene desorption profiles for H-Al-SSZ-26, H-Al-SSZ-33 and H-Al-zeolite-beta after hydrothermal treatment.

Toluene Desorption Profiles for H-Al-SSZ-26, H-Al-SSZ-33 and H-Al-Zeolite-Beta After Hydrothermal Treatment The toluene desorption for aged H-Al-SSZ-26, H-Al-SSZ-33 and H-Al-zeolite-beta was carried out according to the TPD procedures described above. The toluene desorption profiles for these aged molecular sieves are depicted in FIG. 5.

Example 4

Alkali Metal Cation-Exchanged Zeolites

Alkali metal cation-exchanged molecular sieves were prepared by ion exchange of the H-Al-SSZ-26 or H-Al-SSZ-33 with an aqueous solution of a metal (e.g., Li, Na, K, Cs) nitrate according to conditions described above.

Figure 6:
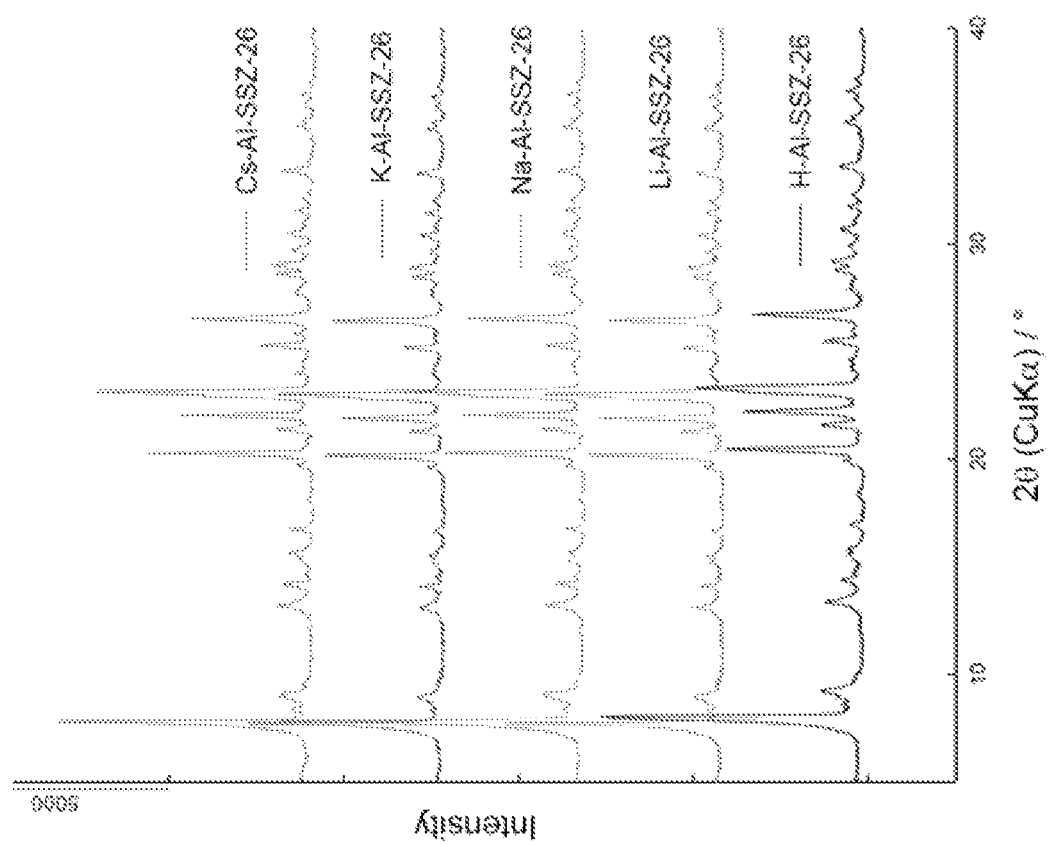
FIG. 6 depicts the powder XRD patterns for Al-SSZ-26 before and after ion exchange with an alkali metal cation.

The XRD patterns of SSZ-26 were obtained as shown in FIG. 6 for SSZ-26 before and after ion exchange with alkali metals. From these patterns, little or no change was seen, implying that no significant structural changes occurred in the zeolites due to ion exchange.

Example 5

Figure 7:
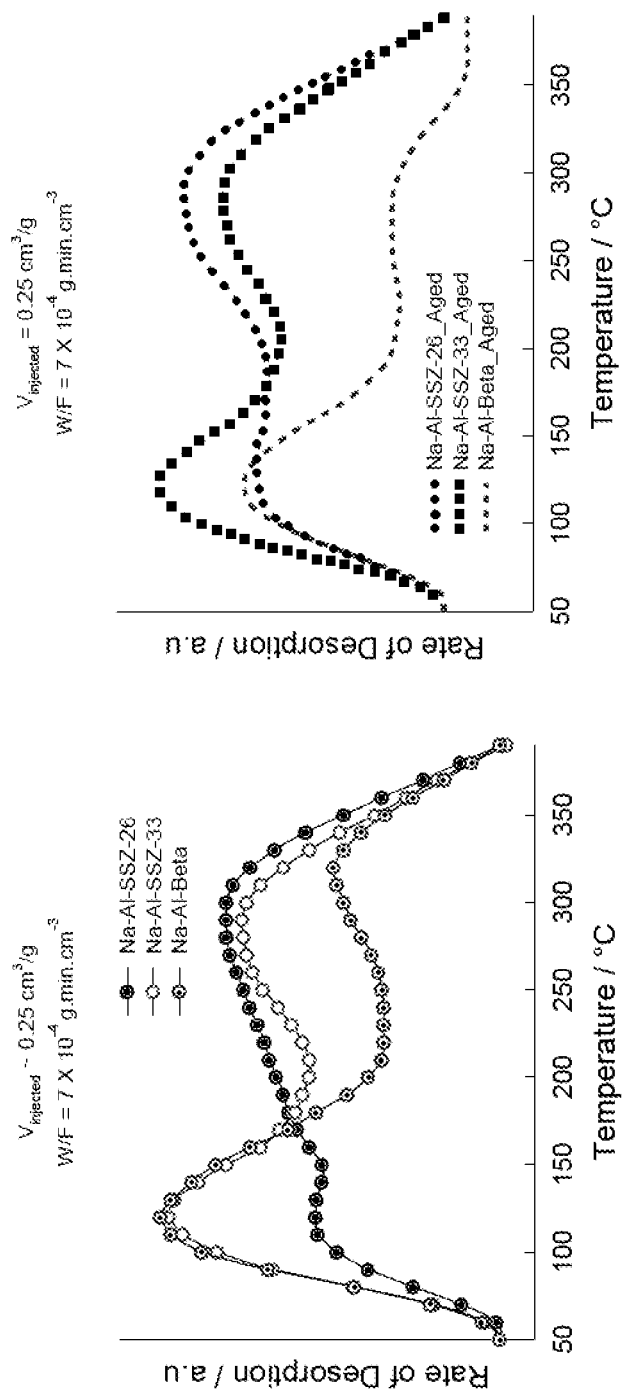
FIG. 7 illustrates toluene desorption profiles for Na-Al-SSZ-26, Na-Al-SSZ-33 and Na-Al-zeolite-beta before and after hydrothermal treatment.

Toluene Desorption Profiles for Na-Al-SSZ-26, Na-Al-SSZ-33 and Na-Al-Zeolite-Beta Before and After Hydrothermal Treatment The toluene desorption for Na-Al-SSZ-26, Na-Al-SSZ-33 and Na-Al-zeolite-beta was carried out according to the TPD procedures described above. The toluene desorption profiles for these zeolites are depicted in FIG. 7. As shown in FIG. 7, both fresh (un-aged) and hydrothermally treated (aged) Na-SSZ-26 and Na-Al-SSZ-33 provided superior adsorption capacity over Na-zeolite beta. Na-zeolite beta showed a significant decrease in the amount of toluene adsorbed after hydrothermal treatment while Na-SSZ-26 and Na-Al-SSZ-33 retained almost similar adsorption capacity before and after hydrothermal treatment.

Example 6

Alkali Metal Effect On Toluene Desorption Profiles for Al-SSZ-26

Figure 8:
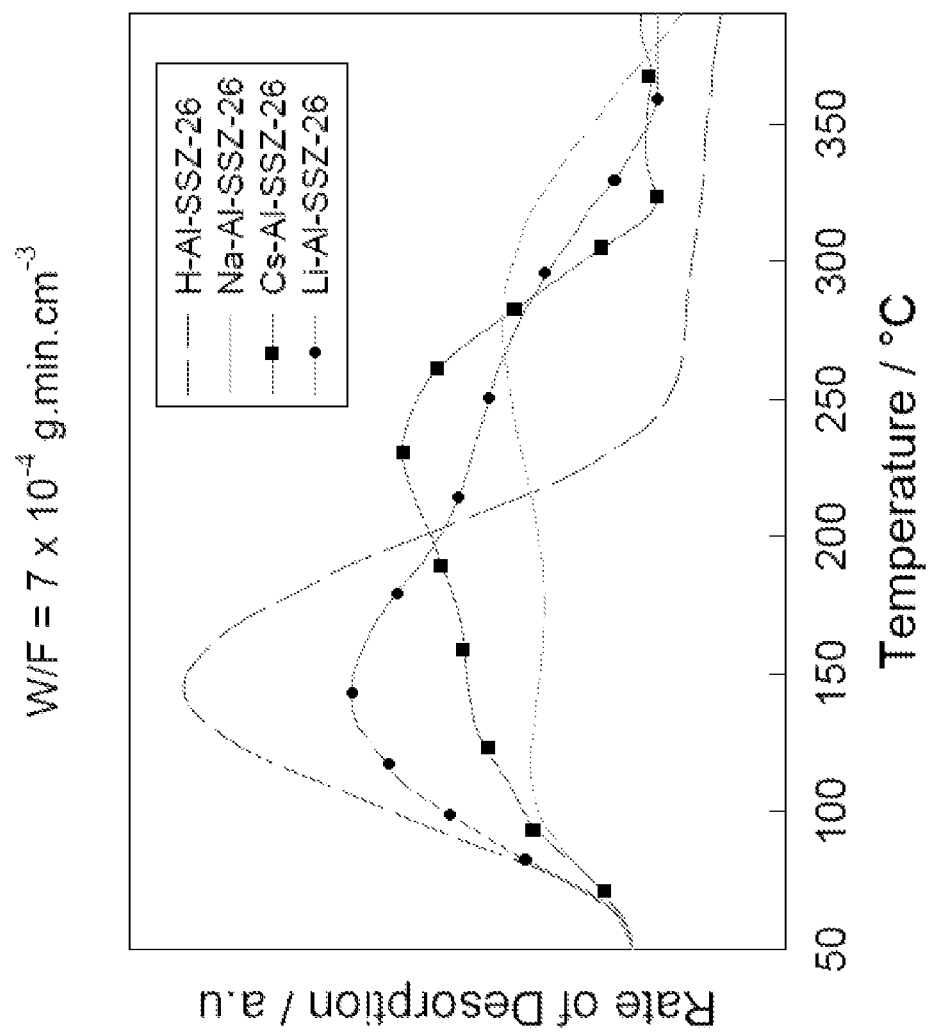
FIG. 8 illustrates the toluene desorption profiles for H-Al-SSZ-26, Li-Al-SSZ-26, Na-Al-SSZ-26 and Cs-Al-SSZ-26.
Figure 9:
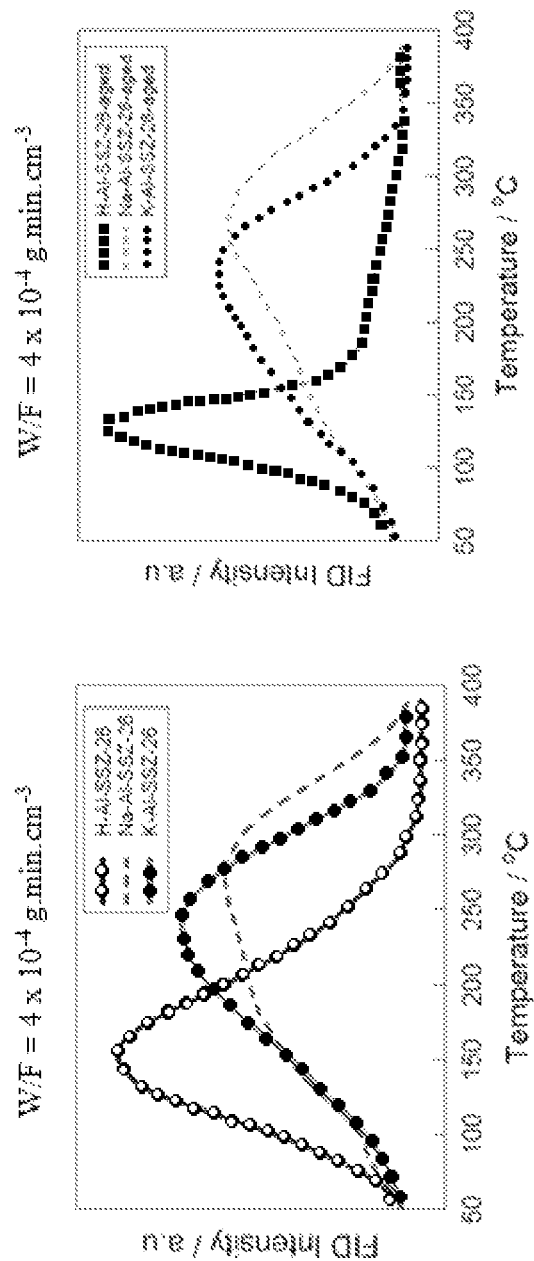
FIG. 9 illustrates the toluene desorption profiles for H-Al-SSZ-26, Na-Al-SSZ-26, and K-Al-SSZ-26 before and after hydrothermal treatment.

The toluene desorption for SSZ-26 with various exchangeable alkali metal cations was carried out according to the TPD procedures described above. The toluene desorption profiles for H-Al-SSZ-26, Li-SSZ-26, Na-SSZ-26, and Cs-SSZ-26 are depicted in FIG. 8. FIG. 9 illustrates the toluene desorption profiles for H-Al-SSZ-26, Na-Al-SSZ-26, and K-Al-SSZ-26 before and after hydrothermal treatment. As shown in FIG. 9, the notable feature of Na-and K-exchanged SSZ-26 molecular sieves is that they retain trapping capacity even after aging, unlike H-Al-SSZ-26. While not wishing to be bound by any particular theory, this effect may be attributed to the stabilization of Al by $Na^+$ or $K^+$ in the ion exchangeable sites in SSZ-26 against the effects of hydrothermal aging, thereby retarding the process of de-alumination. The enhanced trapping behavior of alkali metal-exchanged zeolites may be due to greater π-interactions compared to their acid counterparts in the case of toluene as a probe. It is also believed that charge density may play a role in the performance differences among the alkali metal cations, with the notable exception of Li. Alkali metal exchanged molecular sieves show enhanced desorption temperature and increased hydrothermal stability.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method of treating a cold-start engine exhaust gas stream comprising hydrocarbons and other pollutants, the method comprising:
   a) flowing the exhaust gas stream over a molecular sieve bed, the molecular sieve bed comprising an alkali metal cation-exchanged molecular sieve having intersecting 10- and 12-membered ring pore channels, having increased hydrothermal stability to provide a first exhaust stream;
   b) flowing the first exhaust gas stream over a catalyst to convert any residual hydrocarbons and other pollutants contained in the first exhaust gas stream to innocuous products to provide a treated exhaust stream; and
   c) discharging the treated exhaust stream.

2. The method of claim 1, wherein the engine is an internal combustion engine.

3. The method of claim 2, wherein the internal combustion engine is an automobile engine.

4. The method of claim 1, wherein the molecular sieve has at least 95% of its ionexchangeable sites exchanged with an alkali metal cation.

5. The method of claim 1, wherein the alkali metal cation is selected from the group consisting of sodium, potassium, cesium, and mixtures thereof.

6. The method of claim 1, wherein the alkali metal cation is sodium.

7. The method of claim 1, wherein the molecular sieve is selected from the group consisting of ITQ-22, MCM-68, NU-87, SSZ-56, SSZ-57, a CON type molecular sieve, and mixtures thereof.

8. The method of claim 7, wherein the CON type molecular sieve is selected from the group consisting of CIT-I, ITQ-24, SSZ-26, SSZ-33, and mixtures thereof.

9. The method of claim 7, wherein the CON type molecular sieve is selected from the group consisting of SSZ-26, SSZ-33, and mixtures thereof.

10. The method of claim 1, wherein the molecular sieve has deposited on it a metal selected from the group consisting of platinum, palladium, rhodium, ruthenium, and mixtures thereof.

11. The method of claim 10, wherein the metal is a mixture of platinum and palladium.

12. A method for removing toluene from a gaseous hydrocarbon stream comprising:
   a) passing a toluene-containing hydrocarbon stream over an adsorbent comprising an alkali metal cation-exchanged molecular sieve having intersecting 10- and 12-membered ring pore channels, having increased hydrothermal stability; and
   b) recovering a product stream with reduced toluene content.

13. The method of claim 12, wherein the alkali metal cation is selected from the group consisting of sodium, potassium, cesium, and mixtures thereof.

14. The method of claim 12, wherein the alkali metal cation is sodium.

15. The method of claim 12, wherein the molecular sieve is selected from the group consisting of ITQ-22, MCM-68, NU-87, SSZ-56, SSZ-57, a CON type molecular sieve, and mixtures thereof.

16. The method of claim 15, wherein the CON type molecular sieve is selected from the group consisting of CIT-I, ITQ-24, SSZ-26, SSZ-33, and mixtures thereof.

17. The method of claim 15, wherein the CON type molecular sieve is selected from the group consisting of SSZ-26, SSZ-33, and mixtures thereof.

* * * * *